United States Patent
Iinuma et al.

(10) Patent No.: US 7,476,482 B2
(45) Date of Patent: Jan. 13, 2009

(54) MG-BASED FERRITE, AN ELECTROPHOTOGRAPHIC DEVELOPMENT CARRIER CONTAINING THE FERRITE, AND DEVELOPER CONTAINING THE CARRIER

(75) Inventors: Hidehiko Iinuma, Shibukawa (JP); Masatomo Hayashi, Shibukawa (JP); Natsuki Matsuura, Shibukawa (JP); Yukinari Oguma, Shibukawa (JP)

(73) Assignee: Kanto Denka Kogyo Co., Ltd., Tokyo (JP)

( * ) Notice: Subject to any disclaimer, the term of this patent is extended or adjusted under 35 U.S.C. 154(b) by 206 days.

(21) Appl. No.: 10/578,901

(22) PCT Filed: Nov. 5, 2004

(86) PCT No.: PCT/JP2004/016811

§ 371 (c)(1),
(2), (4) Date: May 12, 2006

(87) PCT Pub. No.: WO2005/048276

PCT Pub. Date: May 26, 2005

(65) Prior Publication Data

US 2007/0087282 A1   Apr. 19, 2007

(30) Foreign Application Priority Data

Nov. 12, 2003  (JP) ............................. 2003-382668
Sep. 13, 2004  (JP) ............................. 2004-264875

(51) Int. Cl.
*G03G 9/107* (2006.01)
*C04B 35/40* (2006.01)
*H01F 1/00* (2006.01)

(52) U.S. Cl. ............................. 430/111.31; 252/62.63; 252/62.64

(58) Field of Classification Search ............ 430/111.31, 430/111.33; 252/62.64, 62.63
See application file for complete search history.

(56) References Cited

U.S. PATENT DOCUMENTS

| 2,576,456 | A | 11/1951 | Harvey et al. |
| 2,977,312 | A | 3/1961 | Gorter et al. |
| 3,770,639 | A | 11/1973 | Okazaki et al. |
| 5,466,552 | A | 11/1995 | Sato et al. |
| 5,538,656 | A | 7/1996 | Mano et al. |
| 5,595,850 | A | 1/1997 | Honjo et al. |
| 5,795,693 | A | 8/1998 | Okado et al. |
| 6,090,517 | A | 7/2000 | Tamura et al. |
| 6,309,558 | B1 | 10/2001 | Kinoshita et al. |
| 2001/0045541 | A1 | 11/2001 | Inoue |
| 2006/0199093 | A1* | 9/2006 | Iinuma et al. .......... 430/111.31 |

FOREIGN PATENT DOCUMENTS

| EP | 0 686 886 A1 | 12/1995 |
| EP | 1 065 191 A1 | 1/2001 |
| JP | 62-37782 B2 | 8/1987 |
| JP | 07-333910 | 12/1995 |
| JP | 08-069131 | 3/1996 |
| JP | 09-211897 | 8/1997 |
| JP | 2860356 B2 | 12/1998 |
| JP | 3243376 B2 | 10/2001 |
| JP | 2003-034533 | 2/2003 |

* cited by examiner

*Primary Examiner*—John L Goodrow
(74) *Attorney, Agent, or Firm*—Browdy and Neimark, P.L.L.C.

(57) ABSTRACT

This invention provides an Mg-based ferrite having a high dielectric breakdown voltage and a saturation magnetization suitable for electrophotographic development, a carrier containing the ferrite, and an electrophotographic developer containing the carrier. The Mg-based ferrite material of this invention comprises Li, Na, K, Rb, Cs, Ca, Sr, Ba, Y, La, Ti, Zr, Hf, V, Nb, Ta, Al, Ga, Si, Ge, P, Sb, Bi or a combination thereof. The Mg-based ferrite material has a saturation magnetization of 30 to 80 emu/g, and a dielectric breakdown voltage of 1.5 to 5.0 kV. The Mg-based ferrite material can realize high image quality, and be in compliance with environmental regulations.

16 Claims, 1 Drawing Sheet

Fig. 1

MG-BASED FERRITE, AN ELECTROPHOTOGRAPHIC DEVELOPMENT CARRIER CONTAINING THE FERRITE, AND DEVELOPER CONTAINING THE CARRIER

TECHNICAL FIELD

The present invention relates to an Mg-based ferrite magnetic material. This material can be used for a carrier of two-component developer in an electrophotographic development device, including a copying machine and a printer. This invention also relates to an electrophotographic developer that contains said material as a carrier.

BACKGROUND ART

Electrophotography is a method comprising forming an electrostatic latent image on a photoreceptor; depositing a toner onto the image to form an imagewise pattern; and transferring the toner to an object. Electrophotography includes two major categories: two-component development and one-component development. In the two-component development, a developer contains two components of a carrier and a toner, and a magnetic carrier is often used as a carrier.

In the two-component development with a magnetic carrier, a developer is stirred and mixed in a developing vessel such that a toner is electrostatically charged to a desired extent by friction between the carrier and the toner. The mixed developer is then fed to a magnet roll (hereinafter, referred to a roll), and spikes of the developer are formed along magnetic lines. The spikes are called magnetic brushes. The magnetic brushes are allowed to come into contact with a surface of a photoreceptor, and thereby the charged toner is deposited onto the surface in conformity with the electrostatic latent image to form a desired image.

While the toner is transferred onto the photoreceptor, the magnetic carrier remains on the roll, and is recovered and reused. Hence, the carrier preferably has a high longevity.

Electrophotography is utilized in a wide range of fields including a copying machine, a printer and a facsimile. In these fields, there is a need to improve image quality, resolution, gradation properties, and reproducibility of fine lines. Deterioration of image quality is partially due to a leak of the potential of the electrostatic latent image via the carrier. With the lower electric resistance of the carrier, the leak phenomenon is more likely to occur. However, even for a carrier initially having a high electric resistance, the electric resistance may be reduced by dielectric breakdown when a high voltage is applied. In such a case, the carrier may contribute to a leak.

Recently, a high bias potential is often applied between a photoreceptor and a roll to achieve high image quality. At such a high bias potential, a conventional carrier tends to cause dielectric breakdown. Hence, there is a need for an electrophotographic development carrier having a high dielectric breakdown voltage and a high longevity.

In order to improve image quality, it is necessary to adjust the saturation magnetization of a magnetic carrier into a certain range, as well as to enhance dielectric breakdown voltage. When the saturation magnetization is too small, the image quality is deteriorated because carriers are scattered and undesirably deposited on an object. When the saturation magnetization is too large, the spike becomes too hard to maintain image quality.

As a conventional ferrite carrier having a high dielectric breakdown voltage, a Cu—Zn-based ferrite (for example, see Japanese Patent No. 1,688,677) and an Mn—Mg-based ferrite (for example, see Japanese Patent No. 3,243,376) have been used. Under recent environmental regulations, however, it is desired to reduce the amount of heavy metals used such as Cu, Zn, Mn, Co and Ni. For example, under Title 22 of the State Law of California, Ni, Cu, Zn and the like are control subjects. Moreover, under the PRTR system, Mn compounds are designated as compounds that may be harmful to the health of human beings and an ecosystem.

Magnetite ($Fe_3O_4$) has been conventionally known as a magnetic carrier in compliance with environmental regulations; however, magnetite has a problem of a low dielectric breakdown voltage. Moreover, magnetite has a low electric resistance. Due to this low electric resistance, when alternating voltage is applied, a leak phenomenon occurs upon development even if insulating properties are improved by coating with various resins. In order to achieve a high electric resistance for magnetite, there has been an attempt to heat a material in air to form a non-magnetic phase having a high electric resistance ($Fe_2O_3$ phase), which co-exists with magnetite. With the increased percentage of the $Fe_2O_3$ phase in the carrier, the dielectric breakdown voltage becomes higher. However, coercive force is disadvantageously increased. The increased coercive force causes agglomeration of carrier particles, resulting in lowered flowability. The lowered flowability raises a new problem that it is difficult to obtain image quality comparable to that for the ferrite carrier. In addition, since magnetite has a relatively high saturation magnetization, the spike of the magnetic brush becomes too hard.

As an oxide carrier capable of being controlled to have a desired saturation magnetization and meeting environmental regulations, Mg—Fe—O based powder and a method of producing the powder are reported (see Japanese Patent No. 2,860,356). According to this method, a binder is added as a reducing agent, and then sintered in an inert gas atmosphere. Therefore, the valence of Fe can be kept low. As a result, various phases such as magnetite phase and MgO phase co-exist in the resulting powder. Hence, there still remains a problem of a low dielectric breakdown voltage derived from magnetite.

An Mg-based ferrite in the form of a single phase of Mg and Fe is obtained by sintering a stoichiometric composition in air. While this Mg-based ferrite has a high dielectric breakdown voltage, it has a low saturation magnetization from 20 to 25 emu/g.

Accordingly, there still remains a need to realize both a proper saturation magnetization and a high dielectric breakdown voltage simultaneously.

DISCLOSURE OF THE INVENTION

The object of the present invention is to provide a magnetic carrier meeting environmental regulations and achieving a high image quality, in order to overcome the above problems. More specifically, this invention relates to a carrier comprising an Mg-based ferrite material, a process for producing the Mg-based ferrite material, an electrophotographic developer comprising the carrier.

As the result of extensive investigations to solve these problems, the inventors have found that an Mg-based ferrite material containing Li, Na, K, Rb, Cs, Ca, Sr, Ba, Y, La, Ti, Zr, Hf, V, Nb, Ta, Al, Ga, Si, Ge, P, As, Sb, Bi or a combination thereof (hereinafter, "Mg-based ferrite" encompasses Mg-based ferrites containing the above-described elements) has performances (for example, saturation magnetization and dielectric breakdown voltage) required for an electrophotographic development carrier. Moreover, the inventors have found that the properties of the ferrite material can be realized by the process of the present invention comprising at least two heating steps. In particular, the former step may be performed in an inert gas atmosphere, and the latter step may be performed in an oxygen-containing atmosphere.

The problems above are solved by an Mg-based ferrite material having a composition of formula (1):

$$X_aMg_bFe_cCa_dO_e \qquad (1);$$

wherein X is Li, Na, K, Rb, Cs, Sr, Ba, Y, La, Ti, Zr, Hf, V, Nb, Ta, Al, Ga, Si, Ge, P, Sb, Bi or a combination thereof; and a, b, c and d satisfy $$0.001 \leq R(X) \leq 0.15$$

wherein R(X) is represented by the formula:

$$R(X)=a\times(Aw(X)+(n/2)\times Aw(O))/(a\times(Aw(X)+(n/2)\times Aw(O))+b\times Fw(MgO)+(c/2)\times Fw(Fe_2O_3)+d\times Fw(CaO));$$

Aw(X) and Aw(O) are an atomic weight of X and an atomic weight of O, respectively;
n is an oxidation number of X; and
Fw(A) is a formula weight of A, $$0.01 \leq b/(b+c/2) \leq 0.85 \text{ and}$$

$$0 \leq R(Ca) \leq 0.15$$

wherein R(Ca) is represented by the formula:

$$R(Ca)=d\times Fw(CaO)/(a\times(Aw(X)+(n/2)\times Aw(O))+b\times Fw(MgO)+(c/2)\times Fw(Fe_2O_3)+d\times Fw(CaO));$$

wherein Fw(A) is the same as defined in R(X),
e is determined by the oxidation numbers of X, Mg, Fe and Ca.

The Mg-based ferrite material of the present invention has a dielectric breakdown voltage of 1.5 to 5.0 kV, a saturation magnetization of 30 to 80 emu/g, and an average particle diameter of 0.01 to 150 μm.

The problems above can be also solved with an electrophotographic development carrier comprising said Mg-based ferrite material, and an electrophotographic developer comprising the electrophotographic development carrier and a toner.

Furthermore, the problems above can be solved by a process for producing an Mg-based ferrite material which comprises the steps of i) mixing raw materials; ii) sintering the mixed raw materials to grow particles, wherein a maximum temperature is in the range of 800-1500° C.; and (iii) heating the sintered raw materials under an oxygen-containing atmosphere to condition properties of the particles, wherein a maximum temperature is in the range of 300-1000° C. The step (i) of mixing raw materials comprises the steps of preparing a slurry containing an Mg-containing compound and an Fe-containing compound; and drying the slurry for granulation. The slurry containing an Mg-containing compound and an Fe-containing compound may further comprise a compound containing Li, Na, K, Rb, Cs, Sr, Ba, Y, La, Ti, Zr, Hf, V, Nb, Ta, Al, Ga, Si, Ge, P, As, Sb, Bi, Ca or a mixture thereof. The slurry containing an Mg-containing compound and an Fe-containing compound may further contain a binder. The content of the binder is 0.1 to 5 weight % based on the total amount of the raw materials in the slurry.

DETAILED DESCRIPTION

The Mg-based ferrite material of the present invention can be used as a magnetic material in various applications, for example, a magnetic fluid, a magnetic recording medium, an electromagnetic wave absorber and a magnetic core material, particularly in an electrophotographic developer.

The Mg-based ferrite material of the present invention has a composition of formula (1):

$$X_aMg_bFe_cCa_dO_e \qquad (1);$$

wherein X is Li, Na, K, Rb, Cs, Sr, Ba, Y, La, Ti, Zr, Hf, V, Nb, Ta, Al, Ga, Si, Ge, P, Sb, Bi or a combination thereof; and a, b, c and d satisfy $$0.001 \leq R(X) \leq 0.15$$

wherein R(X) is represented by the formula:

$$R(X)=a\times(Aw(X)+(n/2)\times Aw(O))/(a\times(Aw(X)+(n/2)\times Aw(O))+b\times Fw(MgO)+(c/2)\times Fw(Fe_2O_3)+d\times Fw(CaO));$$

Aw(X) and Aw(O) are an atomic weight of X and an atomic weight of O, respectively;
n is an oxidation number of X; and
Fw(A) is a formula weight of A, $$0.01 \leq b/(b+c/2) \leq 0.85 \text{ and}$$

$$0 \leq R(Ca) \leq 0.15$$

wherein R(Ca) is represented by the formula:

$$R(Ca)=d\times Fw(CaO)/(a\times(Aw(X)+(n/2)\times Aw(O))+b\times Fw(MgO)+(c/2)\times Fw(Fe_2O_3)+d\times Fw(Cao));$$

wherein Fw(A) is the same as defined in R(X),
e is determined by the oxidation numbers of X, Mg, Fe and Ca.

As used herein, the Mg-based ferrite material means a material containing an Mg-containing ferrite of a normal spinel structure or an inverse spinel structure, and may have a single phase or a plurality of phases. The Mg-based ferrite material may comprise an amorphous phase or a phase having a crystal structure other than the spinel structure. For example, the Mg-based ferrite material may comprise a phase other than the Fe-containing spinel phase, for example, a garnet phase and a magnetoplumbite phase, or may comprise an Fe-free phase including MgO and $Ca_2Fe_2O_5$. The composition of the Mg-based ferrite material means an average composition of the overall Mg-based ferrite material, rather than a composition of specified phases in the Mg-based ferrite material.

X is a Group 1 element such as Li, Na, K, Rb and Cs, a Group 2 element such as Sr and Ba, a Group 3 element such as Y, a Group 4 element such as Ti, Zr and Hf, a Group 5 element such as V, Nb and Ta, a Group 13 element such as Al and Ga, a Group 14 element such as Si and Ge, a Group 15 element such as P, Sb and Bi or a combination thereof. Preferably, X is Li, Na, K, Sr, Y, La, Ti, Zr, V, Al, Si, P, Bi or a combination thereof and more preferably, X is Li, Na, Sr or a combination thereof.

As far as desired carrier properties can be obtained, a, b, c, and d are not particularly limited. When R(X) of a function of a, b, c and d is 0.001 or more, the effect by the addition of the element X can be easily detected. The upper limit of R(X) is not particularly restricted and is preferably 0.15 or less, more preferably 0.08 or less. When R(X) exceeds the above-described range, the magnetic hysteresis loop may be broadened, and the increase of dielectric breakdown voltage tends to slow down.

n is an oxidation number of the element X. For example, when X is Li or Na, n is 1; when X is Sr, n is 2; when X is Y, La, Al or Bi, n is 3; when X is Ti, Zr or Si, n is 4; and when X is P or V, n is 5. X may be a single element or a combination of two or more elements. When n used is a combination of two or more elements, n is defined by a molar average. For example, when Li and Sr are used as X at a molar ratio of 0.2:0.8, n is found as follows:

$$n=0.2\times1+0.8\times2=1.8$$

b/(b+c/2) is a ratio of the molar amount (b) of MgO to the sum (b+c/2) of the molar amounts of MgO and $Fe_2O_3$, wherein the molar amounts of Mg and Fe in the Mg-based ferrite material is converted to respective molar amounts of MgO and $Fe_2O_3$. Thus, a composition having a large b/(b+c/2) corresponds to an Mg-rich composition, and a composition having a small b/(b+c/2) corresponds to an Fe-rich composition. In the present invention, b/(b+c/2) is not smaller than 0.01, preferably not smaller than 0.05, more preferably not smaller than 0.10, and not larger than 0.85, preferably not larger than 0.70. When b/(b+c/2) is below the above-described range, dielectric breakdown voltage tends to decrease due to the formation of excessive $Fe_2O_3$. When b/(b+c/2) exceeds the above-described range, a non-magnetic phase (for example, MgO phase) may be excessively formed, resulting in decrease of saturation magnetization.

In one embodiment of the present invention, the addition of the above-described element X to the Mg-based ferrite material can improve dielectric breakdown voltage without adversely affecting saturation magnetization. At an Fe-rich composition for a conventional material, although a relatively high saturation magnetization can be obtained, there still remains a problem of a low dielectric breakdown voltage. Thus, the addition of the element X in the present invention is effective for the Fe-rich composition. For example, the present invention is effective when b/(b+c/2) is not smaller than 0.01, and not larger than 0.40, preferably not larger than 0.30, more preferably not larger than 0.20. Provided that desired saturation magnetization and dielectric breakdown voltage vary depending on the application, and accordingly the present invention is by no means limited to the Fe-rich composition. "Addition of the element X to the Mg-based ferrite material" as used herein means that the Mg-based ferrite material is allowed to have a composition comprising X. The method for adding the element X, the raw material of X to be added, and the state of X in the Mg-based ferrite material are not particularly restricted.

In another embodiment of the present invention, the addition of the above-described element X can improve the saturation magnetization. This effect can be observed, for example, on the Mg-based ferrite material containing Ca as will be described below.

As explained above, the Mg-based ferrite material of the present invention improves dielectric breakdown voltage and saturation magnetization. As a result, a high image quality and excellent gradation properties can be obtained.

Without being bound to any theory, these advantages can be attributed to an effect of the Mg and/or Fe site substitution with X on the structural stability and conductivity, a change in magnetic structure via superexchange interaction, modification of a grain boundary without solid solution, formation of other phases, and a change in magnetic domain structure.

The Mg-based ferrite material of the present invention may further comprise Ca. When the Mg-based ferrite material comprises Ca, saturation magnetization can be increased without much lowering dielectric breakdown voltage. In general, with an Mg-rich composition such as a composition having b/(b+c/2) of 0.3 or more, a problem of the deterioration of saturation magnetization is caused with increased Mg amounts. Therefore, addition of Ca is effective for the Mg-rich composition.

The amount of Ca added is not particularly limited, and with not less than 0.001 of R(Ca), its effect is easily detectable. With an excess amount of Ca added, an impurity phase (for example, $Ca_2Fe_2O_5$) is formed to lower saturation magnetization. Thus, the amount of R(Ca) is typically not more than 0.15, preferably not more than 0.10, more preferably not more than 0.08.

The Mg-based ferrite material of the present invention may comprises one or more elements other than Li, Na, K, Sr, Y, La, Ti, Zr, V, Al, Si, P, Bi and Ca. These elements may substitute the sites of Mg and Fe or may form another phase. However, in view of environmental regulations, it is preferred that the sum of the molar number of heavy metals does not exceed the sum of the molar number of Mg and Ca.

The Mg-based ferrite material of the present invention has a saturation magnetization of no less than 25 emu/g, preferably no less than 30 emu/g, more preferably no less than 40 emu/g, and of no greater than 100 emu/g, preferably no greater than 90 emu/g, more preferably no greater than 80 emu/g, even more preferably no greater than 70 emu/g. When the saturation magnetization is below the range above, undesirable adhesion of carriers causes deterioration of image quality. When the saturation magnetization is beyond the range above, the spikes become hard, resulting in deterioration of image quality.

As used herein, a value of saturation magnetization is as measured at 14 kOe using a vibrating sample magnetometer, and the method of measurement is as described in Examples.

The Mg-based ferrite material of the present invention has a dielectric breakdown voltage of no less than 1.5 kV, preferably no less than 2.5 kV. When the dielectric breakdown voltage is below the range above, a leak of electrostatic latent image potential on a photoreceptor may occur upon development, and the life of the carrier may be decrease. With the higher dielectric breakdown voltage, high image quality can be kept for a longer period. Therefore, the upper limit of the dielectric breakdown voltage is not restricted. With a view to satisfying other properties, the dielectric breakdown voltage may be of no greater than 10.0 kV, preferably no greater than 7.5 kV, more preferably no greater than 5.0 kV.

As used herein, a value of the dielectric breakdown voltage is a value obtained at the time when a leak electric current exceeds 110 mA under an alternating voltage applied. The method of measurement is as described in Examples.

The average particle diameter of the Mg-based ferrite material is typically of no less than 0.01 μm, preferably no less than 0.1 μm, more preferably no less than 2 μm, even more preferably no less than 5 μm, most preferably of no less than 10 μm, and of no greater than 200 μm, preferably no greater than 150 μm. When the particle diameter is below the range above, the material tends to deposit onto a photoreceptor excessively, and when the particle diameter is beyond the range above, an image becomes rough, and an image quality is deteriorated. The average particle diameter can be controlled by various types of granulation means, grinding means and classification means.

The Mg-based ferrite carrier of the present invention can retain stabilized carrier properties. The stabilized properties may be attributed to the following reasons: (i) when carriers are coated, the coating is hard to be exfoliated during stirring, and can be retained in a stabilized state; and (ii) change in an amount of charge of the carrier during stirring is small.

Hereafter, the process for producing the Mg-based ferrite carrier of the present invention will be described. The Mg-based ferrite material of the present invention can be produced by the process comprising step i) of mixing raw materials; step ii) of sintering the mixed raw materials to grow particles wherein a maximum temperature is in the range of 800-1500° C.; and step iii) of heating the sintered raw materials under an oxygen-containing atmosphere to condition properties of the particles, wherein a maximum temperature is in the range of 300-1000° C.

Raw materials to be used in the mixing step i) are compounds containing Mg, Fe, Ca and the element X. The raw materials include various compounds such as oxides, carbonates, hydroxides, oxyhydroxides, oxalates, nitrates, acetates, lactates and chlorides. Specifically, MgO, $MgCO_3$, $Mg(OH)_2$ and $MgCl_2$ can be used as Mg raw materials; FeO, $Fe_2O_3$, $Fe_3O_4$ and $Fe(OH)_x$ (wherein x is a number of 2 to 3) can be used as Fe raw materials; $Li_2O$, $Li_2CO_3$ and LiOH can be used as Li raw materials; $Na_2O$, $Na_2CO_3$ and NaOH can be used as Na raw materials; $K_2O$, $K_2CO_3$ and KOH can be used as K raw materials; SrO and $SrCO_3$ can be used as Sr raw materials; $Y_2O_3$ can be used as a Y raw material; $La_2O_3$ can be used as a La raw material; $TiO_2$ including anatase and rutile can be used as a Ti raw material; $Zr(OH)_4$ and $ZrO_2$ can be used as Zr raw materials; various types of vanadium oxides can be used as V raw materials; various types of alumina such as α-alumina, β-alumina and γ-alumina can be used as Al raw materials; various types of silica can be used as Si raw materials; $P_2O_5$ can be used as a P raw material; $Bi_2O_3$ is used as a Bi raw material; and CaO, $CaCO_3$, $Ca(OH)_2$ and $CaCl_2$ can be used as Ca raw materials. In view of treatment of generated gases during the sintering step, it is preferable to use oxides, carbonates, hydroxides, oxalates, oxyhydroxides, and mixtures thereof. For each element, one compound may be used as a raw material. Alternatively, a mixture of compounds may be used. Otherwise, a part of raw materials may be mixed at a predetermined ratio in advance according to a conventional methods including co-precipitation method, then be provided for the step ii).

The raw materials above are weighed and mixed at a predetermined composition. Examples of a method to mix the raw materials include, without limitation, various wet mixing methods such as wet mixing with water, and various dry mixing methods. For example, the above raw materials may be ground and mixed in a wet ball mill, an attritor or a Dyno-Mill to form a slurry. A predetermined amount of a binder may be added to the slurry. As the binder, various polymers, for example, polyvinyl alcohol, CMC and an acrylic thickener can be used. In the case where polyvinyl alcohol is used, the amount thereof is preferably from 0.1 to 5 weight % on the basis of the total amount of the raw materials contained in the slurry. If necessary, a desired amount of a dispersant, an antifoaming agent and the like can be added. A sintering aid may be added to the slurry, or may be mixed in a solid phase before sintering, or may be fed to a gas phase during a sintering or heating treatment. The sintering aid may remain after a heat treatment, which will be described later.

The slurry obtained is dried for granulation by a spray dryer to prepare spherical pellets. The spherical pellets are controlled into a desired shape as an Ferrite material. For example, the spherical pellets can have an average particle diameter from 0.01 to 200 μm.

All the raw materials may be slurried in one procedure. Alternatively, a part of the raw materials, for example, an Mg-containing compound and an Fe-containing compound, may be slurried and dried for granulation, and the remaining raw materials may be then mixed with the granulated particles in a solid phase.

The process for production of the present invention comprises step i) of mixing raw materials, and at least two heating steps: step ii) of sintering the mixed raw materials in an inert gas atmosphere to grow particles, and step iii) of heating the sintered raw materials in an oxygen-containing atmosphere to control and condition properties such as an oxidation number of each metal, a crystal structure, an occupation rate of each site, and a magnetic structure. It is possible to obtain the properties desired for a magnetic carrier, including a dielectric breakdown voltage and a saturation magnetization, by adjusting the conditions of the sintering and heating steps, for example, an oxygen concentration, a sintering temperature, a period for sintering, a heating treatment temperature, and a period for heating treatment. For example, desired carrier properties can be obtained by performing the step iii) in a higher oxygen concentration of the atmosphere than that of the step ii), and setting the maximum temperature of the step ii) to be higher than that of the step iii). Calcination may be performed before the step ii). The step ii) and the step iii) may be performed separately, or may be performed continuously.

The step ii) can be performed in an inert gas atmosphere having an oxygen concentration of no greater than 10 volume %, preferably no greater than 3 volume %, more preferably no greater than 1 volume %. Examples of an inert gas include nitrogen, rare gases such as argon, and a mixture thereof. A reducing gas may further be added into the inert gas atmosphere. The lower limit of oxygen concentration in the inert gas atmosphere is not particularly restricted, and the inert gas atmosphere may contain substantially no oxygen. As used herein, a state of containing substantially no oxygen is referred to a state with an oxygen concentration of less than 0.001 volume %. An atmosphere with an oxygen concentration of no less than 0.001 volume % is advantageous, because it can be provided inexpensively.

The step (iii) is performed in an oxygen-containing atmosphere. The lower limit of the oxygen concentration is not particularly restricted, and the oxygen concentration is preferably not lower than 0.05 volume % and not higher than 70 volume %, preferably not higher than 50 volume %, more preferably not higher than 25 volume %. When the oxygen concentration exceeds the above range, a problem is caused from the standpoint of safety. It is preferable that a gas-phase component other than oxygen is an inert gas or inert gases.

The maximum temperature of the step ii) can be selected such that particles grow to a desired extent. A desired temperature depends upon the degree of grinding and mixing of raw materials. With a view to obtain an average particle diameter of from 0.01 to 200 μm, the temperature is preferably set in the range from 800 to 1,500° C.

The temperature of the step iii) is selected so as to obtain desired physical properties. For example, the temperature may be set in the range from 200 to 1,500° C., preferably from 300 to 1,000° C. With the increased amount of a binder in the step ii), the binder may serve as a reducing agent more clearly. Thus, it is necessary to properly set the amount of the binder added according to the kind thereof.

The Mg-based ferrite obtained is ground by a grinder, and the ground powder is classified to have a desired average particle diameter and a desired distribution of a particle diameter as an Ferrite material for various applications. For classification, various known means such as sieving can be used. Recently, it has been required that the average particle diameter be from 0.01 to 150 μm for magnetic materials such as a magnetic recording medium, an electromagnetic wave absorber, a magnetic core material and a magnetic component of the electrophotographic developer. For example, for the carrier of a two-component developer, an average particle diameter of 10 to 150 μm is required. For the magnetic toner, an average particle diameter of 0.10 to 10 μm is required. The conditions of granulation and/or classification can be adjusted such that the average particle diameter should be within these ranges.

The obtained Mg-based ferrite material of the present invention can be subjected to a surface treatment, if necessary. For example, the Mg-based ferrite material can be used as a core material, and the surface thereof can be coated with resin. The coating resin is not particularly restricted as long as the coated ferrite material satisfies desired physical properties. Examples of the coating resin include various kinds of silicone-based resin such as silicone resin and derivatives thereof, fluorine-based resin, styrene-based resin, acrylic resin, methacrylic resin, polyester-based resin, polyamide-based resin, epoxy-based resin, polyether-based resin, phenol-based resin and melamine-based resin. These resins can be used alone or in combination, and copolymers thereof can also be used. With regard to use in combination, for example, two or more types of resin may be mixed prior to use, or separately coated in turn to form a multilayer. If necessary, other component or components such as a charge control agent, an electric resistance control agent and an adhesion improver may be added to the resin.

Any methods in the prior art can be used for coating the ferrite material with the above resins, and be selected according to a specific application. For example, a spray method with a fluidized bed and a dipping method can be used. The above resins are typically diluted with or dispersed in an organic solvent such as methyl ethyl ketone, methyl isobutyl ketone, tetrahydrofuran, toluene, xylene, chloroform and alcohol or a mixed solvent thereof to prepare a resin solution or an emulsion for use. The ferrite core material of the present invention is then dipped in the resin solution or the emulsion. Alternatively, the above resin solution is sprayed onto the ferrite core material, which is fluidized in advance to form a resin layer. A uniform film can be obtained by spraying the resin solution onto the ferrite core material in a fluidized state.

The amount of the coating resin is preferably from 0.05 to 10.0 weight % of the ferrite material. When the amount of the resin is less than 0.05 weight %, the surfaces of ferrite particles may not be coated sufficiently. When the amount is lager than 10.0 weight %, aggregation may occur among ferrite particles.

In order to remove the solvent and cure the resin after the formation of a coating, various heating methods can be used. The heating temperature is set according to the solvent and the resin used. It is preferable to set the temperature beyond the melting point or the glass transition point of the resin. After the heat-treated particles are allowed to be cooled, grinding and classification are performed again, if desired.

The coating step can be performed between the step ii) and the step iii). In such a case, the curing treatment of the resin and the heating step iii) can be performed simultaneously.

The Mg-based ferrite carrier of the present invention is mixed with a toner at a predetermined ratio for use as a two-component developer. For the two-component developer, the toner concentration is preferably from 2 to 40 weight % based on the amount of the carrier. Various known toners such as a ground toner and a polymerized toner can be used, and various method of producing them can be used.

A toner is prepared by dispersing a colorant and an antistatic agent into a binding resin. Examples of the binding resin include, without limitation, polystyrene-based resin, styrene-acrylic-based resin, styrene-chlorostyrene-based resin, polyester-based resin, epoxy-based resin and polyurethane-based resin. For the colorant and the charge control agent, any agents in the prior art can be used, if desired.

Moreover, the Mg-based ferrite of the present invention can be used as a material in a toner. For example, it can be used as a magnetic material of a magnetic toner.

EXAMPLES

Hereafter, the present invention will be described according to Examples. However, the present invention is by no means restricted by these examples.

Examples 1 to 27

MgO, $Fe_2O_3$, CaO and the additive as described in Table 1 were used as raw materials to produce an Mg-based ferrite material. First, the raw materials were weighed so as to obtain a predetermined composition as listed in Table 1. The weighed raw materials were added to water together with a binder (polyvinyl alcohol), a dispersant and an antifoaming agent; and ground and mixed in a wet ball mill for four hours to prepare a slurry. The concentration of the slurry was 50 weight %. The amount of the antifoaming agent was 0.1 weight %, and the amount of the dispersant was 0.15 weight %, on the basis of the total amount of the raw materials in the slurry.

The obtained slurry was dried for granulation by a spray dryer to prepare spherical pellets. These spherical pellets were sintered at 1,200° C. in an electric furnace in a nitrogen atmosphere. The oxygen concentration in the nitrogen atmosphere was below 1,000 ppm. This sintered material was heated at 500° C. in a nitrogen atmosphere with an oxygen concentration of 20 volume %. Thereafter, the material was ground and classified to obtain an Mg-based ferrite material with an average particle diameter of 50 μm. The contents of particles with a diameter of no less than 75 μm, from 45 to 63 μm, and of no greater than 40 μm are 15 weight %, 50 weight %, and 35 weight %, respectively, on the basis of the total amount of the particles.

In Table 1, the amounts of Mg and Fe are expressed by a molar ratio of MgO and $Fe_2O_3$; the amount of Ca is expressed by weight % of CaO based on the sum of the weight of (MgO+$Fe_2O_3$+CaO+X oxide); the amount of X is expressed by weight % of the X oxide based on the sum of the weight of (MgO+$Fe_2O_3$+CaO+X oxide) and shown in the lower section of the "Additive" column. In the Table, the value in the "MgO" column corresponds to $[b/(b+c/2)] \times 100$ and the value in the "$Fe_2O_3$" column corresponds to $[(c/2)/(b+c/2)] \times 100$; the value in the "CaO" column corresponds to $R(Ca) \times 100$; and the value of the lower section in the "Additive" column corresponds to $R(X) \times 100$.

The saturation magnetization, the dielectric breakdown voltage, and the electric resistance of the obtained Mg based ferrite are shown in Table 1.

TABLE 1

| Sample | Composition | | | Saturation Magnetization (emu/g) | Dielectric Breakdown Voltage (kV) | Electric Resistance (Ω) |
| --- | --- | --- | --- | --- | --- | --- |
| | MgO:$Fe_2O_3$ (molar ratio) | CaO (wt %) | Additive (wt %) | | | |
| Example 1 | 20:80 | 1 | $Li_2O$ 0.5 | 59.4 | 3.4 | $2.2 \times 10^{10}$ |

TABLE 1-continued

| Sample | Composition MgO:Fe$_2$O$_3$ (molar ratio) | CaO (wt %) | Additive (wt %) | Saturation Magnetization (emu/g) | Dielectric Breakdown Voltage (kV) | Electric Resistance (Ω) |
|---|---|---|---|---|---|---|
| Example 2 | 20:80 | 1 | Li$_2$O 1.0 | 57.2 | 3.8 | $2.0 \times 10^{10}$ |
| Example 3 | 20:80 | 1 | Li$_2$O 2.0 | 52.3 | 4.0 | $2.0 \times 10^{9}$ |
| Example 4 | 10:90 | 1 | Li$_2$O 1.0 | 66.7 | 3.1 | $7.2 \times 10^{8}$ |
| Example 5 | 20:80 | 1 | Na$_2$O 0.5 | 61.2 | 3.2 | $3.2 \times 10^{9}$ |
| Example 6 | 20:80 | 1 | Na$_2$O 1.0 | 62.0 | 3.8 | $2.0 \times 10^{9}$ |
| Example 7 | 20:80 | 1 | Na$_2$O 2.0 | 58.0 | 4.0 | $3.3 \times 10^{7}$ |
| Example 8 | 20:80 | 1 | Na$_2$O 5.0 | 54.8 | 4.2 | $1.5 \times 10^{7}$ |
| Example 9 | 20:80 | 1 | Na$_2$O 8.0 | 47.8 | 3.8 | $1.5 \times 10^{7}$ |
| Example 10 | 20:80 | 8 | Na$_2$O 1.0 | 44.5 | 4.3 | $1.0 \times 10^{8}$ |
| Example 11 | 20:80 | 15 | Na$_2$O 1.0 | 33.1 | 4.0 | $1.0 \times 10^{8}$ |
| Example 12 | 15:85 | 1 | Na$_2$O 1.0 | 64.5 | 4.0 | $4.6 \times 10^{7}$ |
| Example 13 | 10:90 | 1 | Na$_2$O 1.0 | 70.1 | 3.3 | $7.2 \times 10^{7}$ |
| Example 14 | 20:80 | 1 | SrO 0.5 | 64.4 | 2.6 | $3.5 \times 10^{10}$ |
| Example 15 | 20:80 | 1 | SrO 1.0 | 64.3 | 3.1 | $2.0 \times 10^{10}$ |
| Example 16 | 20:80 | 1 | SrO 2.0 | 62.1 | 3.5 | $5.1 \times 10^{10}$ |
| Example 17 | 10:90 | 1 | SrO 1.0 | 71.1 | 2.5 | $4.8 \times 10^{8}$ |
| Example 18 | 20:80 | 1 | Al$_2$O$_3$ 1.0 | 61.4 | 1.8 | $2.0 \times 10^{10}$ |
| Example 19 | 20:80 | 1 | SiO$_2$ 1.0 | 54.7 | 2.9 | $1.8 \times 10^{9}$ |
| Example 20 | 20:80 | 1 | P$_2$O$_5$ 1.0 | 53.5 | 2.3 | $3.5 \times 10^{9}$ |
| Example 21 | 20:80 | 1 | K$_2$O 1.0 | 53.8 | 3.7 | $4.3 \times 10^{7}$ |
| Example 22 | 20:80 | 1 | TiO$_2$ 1.0 | 54.9 | 3.0 | $2.1 \times 10^{9}$ |
| Example 23 | 20:80 | 1 | V$_2$O$_5$ 1.0 | 55.7 | 2.2 | $5.2 \times 10^{8}$ |
| Example 24 | 20:80 | 1 | Y$_2$O$_3$ 1.0 | 51.7 | 2.2 | $4.3 \times 10^{8}$ |
| Example 25 | 20:80 | 1 | ZrO$_2$ 1.0 | 55.5 | 2.4 | $4.2 \times 10^{9}$ |
| Example 26 | 20:80 | 1 | Bi$_2$O$_3$ 1.0 | 62.7 | 1.8 | $3.5 \times 10^{10}$ |
| Example 27 | 20:80 | 1 | La$_2$O$_3$ 1.0 | 55.4 | 1.5 | $1.1 \times 10^{10}$ |

The conditions for measuring the saturation magnetization, dielectric breakdown voltage and the electric resistance are as follows.

<Measurement of Saturation Magnetization>

Saturation magnetization was measured by a vibrating sample magnetometer (VSMP-1S, manufactured by Toei Kogyo). A sample was placed in a measuring capsule (0.0565 cc), and a magnetic field of 14 kOe was applied.

<Measurement of Dielectric Breakdown Voltage>

Figure 1:
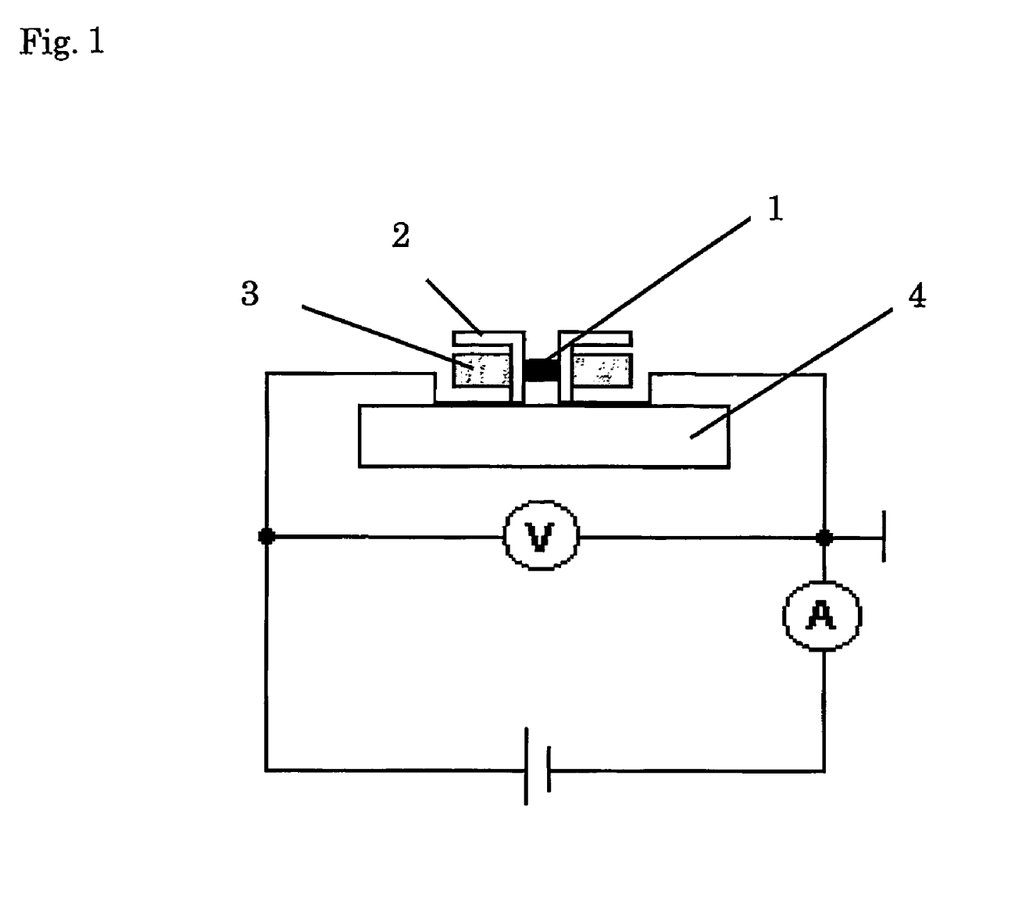
FIG. 1 is a circuit diagram of a device for measuring dielectric breakdown voltage. 1: sample, 2: brass, 3: magnetic pole, 4: Teflon support.

Dielectric breakdown voltage was measured by means of a device as shown in FIG. 1. The distance between magnetic poles of the opposing N pole and S pole was 8 mm (surface flux density at a magnetic pole: 1,500 G, counter magnetic pole area: 10×30 mm). Non-magnetic plate electrodes (electrode area: 10×40 mm, electrode distance: 4 mm) were arranged in parallel between the magnetic poles. 200 mg of a sample was put between the electrodes and held therebetween by magnetic force. Alternating voltage was then applied using a withstand voltage tester (TOS5051, manufactured by Kikusui Denshi Kogyo). The applied voltage at the time when a leak electric current exceeded 110 mA was determined to be a dielectric breakdown voltage.

<Electric Resistance>

The measurement of an electric resistance was performed by holding a sample between the same electrodes as in the above measurement of dielectric breakdown voltage; applying a direct voltage of 100 V; and measuring electric resistance by an insulation resistance tester (TR-8601, manufactured by Takeda Riken).

Comparative Examples 1 to 5

MgO, $Fe_2O_3$ and CaO were weighed and mixed so as to obtain a predetermined composition as listed in Table 2, and Mg-based ferrites were then produced in the same manner as in Examples 1 to 27.

Comparative Example 6

An Mg-based ferrite was produced in the same manner as in Comparative Examples 1 to 5 except that $B_2O_3$ was used as a raw material in addition to MgO, $Fe_2O_3$ and CaO.

The values of saturation magnetization, dielectric breakdown voltage and electric resistance in Comparative Examples 1 to 6 are shown in Table 2.

TABLE 2

| Sample | Composition | | | Saturation Magnetization (emu/g) | Dielectric Breakdown Voltage (kV) | Electric Resistance (Ω) |
|---|---|---|---|---|---|---|
| | MgO:$Fe_2O_3$ (molar ratio) | CaO (wt %) | Additive (wt %) | | | |
| Comparative Example 1 | 20:80 | 1 | — | 63.2 | 1.3 | $1.4 \times 10^{11}$ |
| Comparative Example 2 | 20:80 | 8 | — | 39.0 | 4.0 | $5.2 \times 10^{8}$ |
| Comparative Example 3 | 20:80 | 15 | — | 28.1 | 4.0 | $4.5 \times 10^{8}$ |
| Comparative Example 4 | 15:85 | 1 | — | 70.0 | 1.2 | $1.7 \times 10^{10}$ |
| Comparative Example 5 | 10:90 | 1 | — | 73.8 | 1.1 | $2.2 \times 10^{9}$ |
| Comparative Example 6 | 20:80 | 1 | $B_2O_3$ 1.0 | 62.6 | 0.8 | $2.8 \times 10^{9}$ |

As shown in Tables 1 and 2, the Mg-based ferrites containing Li, Na, K, Sr, Y, La, Ti, Zr, V, Al, Si, P or Bi can have improved dielectric breakdown voltage. Moreover, the saturation magnetization can be maintained in an appropriate range. Furthermore, when R(Ca) exceeds 0.08, for example, R(Ca)=0.15 (Example 11 and Comparative Example 3), the saturation magnetization can be improved without lowering the dielectric breakdown voltage.

Example 28

[Production of Mg-Based Ferrite Material]

An Mg-based ferrite material was produced by using MgO, $Fe_2O_3$ and CaO and the additive as described in Table 3. First, these raw materials were weighed so as to obtain a predetermined composition as listed in Table 3. The weighed raw materials were added to water together with a binder (polyvinyl alcohol), a dispersant and an antifoaming agent; and ground and mixed for four hours in a wet ball mill to prepare slurry. The concentration of the slurry was 50 weight %. The amount of the antifoaming agent was 0.1 weight %, and the amount of the dispersant was 0.15 weight % on the basis of the total amount of the raw materials in the slurry.

The obtained slurry was dried for granulation by a spray drier to prepare spherical pellets. These spherical pellets were sintered at 1,300° C. in a nitrogen atmosphere in an electric furnace. The oxygen concentration in the nitrogen atmosphere was below 1,000 ppm. This sintered material was heated at 450° C. in a nitrogen atmosphere having an oxygen concentration of 20 volume %. Thereafter, the heat-treated material was ground and classified to obtain an Mg-based ferrite material having an average particle diameter of 50 μm. The saturation magnetization, dielectric breakdown voltage and electric resistance of the obtained Mg-based ferrite are shown in Table 3.

[Production of Coating Carrier]

A coating carrier was produced by coating a core material of the above Mg-based ferrite material with a silicone resin. The coating treatment was performed by spray-coating the Mg-based ferrite material with a silicone resin solution diluted with toluene; and then curing the material to 200° C. The amount of the coating resin was 1.0 weight % based on the core material.

[Evaluation of Coating Residual Ratio]

The coating carrier was mixed with a commercially available two-component development toner (a negatively chargeable toner) to form a developer. The toner concentration was 6 weight %. The carrier and the toner were mixed in a developing vessel of a commercially available copying machine. The mixture or the developer was stirred at 400 rpm in the normal temperature and humidity environment for two hours and in a high temperature and humidity environment for two hours. The total time for mixing was thus four hours. The normal temperature and humidity environment means an environment having a temperature of 23° C. and a humidity of 55%. The high temperature and humidity environment means an environment having a temperature of 35° C. and a humidity of 85%. The ratio of the residual amount of the coating in the stirring procedure (hereafter referred to coating residual ratio) was evaluated by performing X-ray fluorescence analysis of the coating carrier before and after the stirring procedure; and calculating the coating residual ratio from the X-ray intensity of Si and Fe by the following formula:

$$\text{Coating Residual Ratio} = (Si_f/Fe_f)/(Si_i/Fe_i) \times 100$$

wherein
$Si_f$ is an X-ray intensity of Si after stirring;
$Fe_f$ is an X-ray intensity of Fe after stirring;
$Si_i$ is an X-ray intensity of Si before stirring; and
$Fe_i$ is an X-ray intensity of Fe before stirring;

The apparatus used was ZSX-100e, manufactured by Rigaku Denki.

The results are shown in Table 3.

TABLE 3

| Sample | Composition MgO:Fe$_2$O$_3$ (molar ratio) | CaO (wt %) | Additive (wt %) | Saturation Magnetization (emu/g) | Dielectric Breakdown Voltage (kV) | Electric Resistance (Ω) | Coating Residual Ratio (%) |
|---|---|---|---|---|---|---|---|
| Example 28 | 20:80 | 1 | Na$_2$O 1.0 | 56.0 | 2.5 | 2.1 × 10$^8$ | 100 |
| Comparative Example 7 | 14:86 | — | — | 71.0 | 0.1 | 1.1 × 10$^9$ | 88 |
| Comparative Example 8 | 35:65 | — | — | 54.0 | 0.1 | 2.3 × 10$^9$ | 91 |

Comparative Examples 7 and 8

Mg-based ferrite materials and ferrite carriers thereof were produced in the same manner as those of Example 28, except that the step of heating at 450° C. in a nitrogen atmosphere having an oxygen concentration of 20 volume % was omitted. The composition of the raw materials is shown in Table 3. Saturation magnetization, dielectric breakdown voltage, electric resistance, and coating residual ratio were measured as in Example 28.

As shown in Table 3, the Mg-based ferrite containing Ca shows suppressed exfoliation of the coating of the developer during the stirring procedure under the normal temperature and humidity environment and under the high temperature and humidity environment. Consequently, the life of the carrier can be improved, and carrier properties can be stabilized and maintained.

Example 29

[Production of an Mg-Based Ferrite Material]

An Mg-based ferrite material was produced by using MgO, Fe$_2$O$_3$ and CaO and the additive as shown in Table 4. First, these raw materials were weighed so as to obtain a predetermined composition as listed in Table 4. The weighed raw materials were added to water together with a binder (polyvinyl alcohol), a dispersant, and an antifoaming agent; and ground and mixed for four hours in a wet ball mill to prepare slurry. The concentration of the slurry was 50 weight %. The amount of the antifoaming agent was 0.1 weight %, and the amount of the dispersant was 0.15 weight % on the basis of the total amount of the raw materials in the slurry.

The obtained slurry was dried for granulation by a spray dryer to prepare spherical pellets. These spherical pellets were sintered at 1,300° C. in an electric furnace in a nitrogen atmosphere. The oxygen concentration in the nitrogen atmosphere was below 1,000 ppm. This sintered material was heated at 450° C. in a nitrogen atmosphere with an oxygen concentration of 20 volume %. Thereafter, the heat-treated material was ground and classified to obtain an Mg-based ferrite material with an average particle diameter of 50 μm.

Saturation magnetization, dielectric breakdown voltage, and electric resistance were measured as in Example 28.

[Production of Coating Carrier]

A coating carrier was produced by coating a core material of the above Mg-based ferrite material with silicone resin. The coating treatment was performed by spray-coating the Mg-based ferrite material with a silicone resin solution diluted with toluene; and then curing the material to 200° C. The amount of the coating resin was 1.0 weight % based on the core material.

[Measurement of Change in an Amount of Charge]

In a 100 cc glass bottle, 47.5 g of the coating carrier and 2.5 g of a commercially available two-component development toner (a negatively chargeable toner) were placed, and the stirred in a ball mill at the normal temperatures and humidity to form a two-component developer. The toner concentration of this developer was 5 weight %. The amount of charge was measured 30 seconds and two hours after start of stirring. The percentage change in an amount of charge was evaluated by the following formula:

Change in an Amount of Charge=(B−A)/A×100(%), wherein the amount of charge (A) was as measured 30 seconds after start of stirring, and the amount of charge (B) was as measured two hours after start of stirring.

The results are shown in Table 4.

TABLE 4

| Sample | Composition MgO:Fe$_2$O$_3$ (molar ratio) | CaO (wt %) | Additive (wt %) | Saturation Magnetization (emu/g) | Dielectric Breakdown Voltage (kV) | Electric Resistance (Ω) | Change in Amount of Charge (%) |
|---|---|---|---|---|---|---|---|
| Example 29 | 20:80 | 1 | Na$_2$O 1.0 | 56.0 | 3.7 | 9.2 × 10$^7$ | 23.1 |
| Comparative Example 9 | 14:86 | — | — | 71.0 | 0.2 | 8.5 × 10$^7$ | 53.0 |

Comparative Example 9

An Mg-based ferrite material and an Ferrite carrier thereof were produced in the same manner as those of Example 29, except that the step of heating at 450° C. in a nitrogen atmosphere having an oxygen concentration of 20 volume % was omitted. The composition of the raw materials is shown in Table 4. Saturation magnetization, dielectric breakdown voltage, electric resistance, and change in an amount of charge was measured as in Example 29.

As shown in Table 4, for the Mg-based ferrite containing Ca, the change in the amount of charge is small during the stirring of the developer. Accordingly, stabilized carrier properties can be advantageously obtained.

In the above-described Examples, the effect of adding Li, Na, Sr, B, Al, Si, P, K, Ti, V, Y, Zr, Bi or La to the Mg-based ferrite carrier containing Ca is shown, but such an effect is by no means limited to the Mg-based ferrite carrier containing Ca.

INDUSTRIAL APPLICABILITY

According to the present invention, the low dielectric breakdown voltage, which is the problem of the conventional Mg-Fe-O based ferrite, is improved. As a result, the Mg-based ferrite material satisfies the properties of the dielectric breakdown voltage and the saturation magnetization, which are required for the electrophotographic development carrier. The Mg-based ferrite carrier for electrophotographic development according to the present invention can meet recent environmental regulations, and can realize high image quality to allow the scope of the designing of a developer to be enlarged.

The invention claimed is:

1. An Mg-based ferrite material consisting essentially of $X_2O_n$, MgO and $Fe_2O_3$ components or of $X_2O_n$, CaO, MgO and $Fe_2O_3$ components, and having a composition of formula (1):

$$X_aMg_bFe_cCa_dO_e \qquad (1)$$

wherein

X is Li, Na, K, Rb, Cs, Sr, Ba, Y, La, Ti, Zr, Hf, V, Nb, Ta, Al, Ga, Si, Ge, P, Sb, Bi or a combination thereof; and a, b, c and d satisfy $$0.001 \leq R(X) \leq 0.15$$

wherein

R(X) is represented by the formula:

$R(X)=a\times(Aw(X)+(n/2)\times Aw(O))/(a\times(Aw(X)+(n/2)\times Aw(O))+b\times Fw(MgO)+(c/2)\times Fw(Fe_2O_3)+d\times Fw(CaO));$ Aw(X) and Aw(O) are an atomic weight of X and an atomic weight of O, respectively;
n is an oxidation number of X; and
Fw(A) is a formula weight of A, $$0.01 \leq b/(b+c/2) \leq 0.85 \text{ and}$$

$$0 \leq R(Ca) \leq 0.15$$

wherein

R(Ca) is represented by the formula:

$R(Ca)=d\times Fw(CaO)/(a\times(Aw(X)+(n/2)\times Aw(O))+b\times Fw(MgO)+(c/2)\times Fw(Fe_2O_3)+d\times Fw(CaO));$ wherein
Fw(A) is the same as defined in R(X),
e is determined by the oxidation numbers of X, Mg, Fe and Ca;
wherein the Mg-based ferrite material has a dielectric breakdown voltage in the range of 1.5-5.0 kV; and
wherein the Mg-based ferrite material has a saturation magnetization in the range of 30-80 emu/g measured at 14 kOe using a vibrating sample magnetometer.

2. The Mg-based ferrite material of claim 1, wherein X is Li, Na, K, Sr, Y, La, Ti, Zr, V, Al, Si, P, Bi or a combination thereof.

3. The Mg-based ferrite material of claim 1 or 2, wherein b and c satisfy $$0.01 \leq b/(b+c/2) \leq 0.30.$$

4. The Mg-based ferrite material of claim 1 or 2, wherein the Mg-based ferrite material has an average particle diameter in the range of 0.01-150 μm.

5. An electrophotographic development carrier comprising an Mg-based ferrite material of claim 1.

6. An electrophotographic development carrier of claim 5, wherein the Mg-based ferrite material is coated with a resin.

7. An electrophotographic developer comprising an electrophotographic development carrier of claim 5 or claim 6, and a toner.

8. The electrophotographic developer of claim 7, wherein the ratio of the toner to the carrier by weight is in the range of 2-40 wt %.

9. A process for producing an Mg-based ferrite of claim 1, comprising steps of:
i) mixing raw materials appropriately selected from MgO, $MgCO_3$, $Mg(OH)_2$ and $MgCl_2$ as Mg raw materials; FeO, $Fe_2O_3$, $Fe_3O_4$ and $Fe(OH)_x$ (wherein x is a number of 2 to 3) as Fe raw materials; $Li_2O$, $Li_2CO_3$ and LiOH as Li raw materials; $Na_2O$, $Na_2CO_3$ and NaOH as Na raw materials; $K_2O$, $K_2CO_3$ and KOH as K raw materials; SrO and $SrCO_3$ as Sr raw materials; $Y_2O_3$ as a Y raw material; $La_2O_3$ as a La raw material; $TiO_2$ including anatase and rutile as a Ti raw material; $Zr(OH)_4$ and $ZrO_2$ as Zr raw materials; various types of vanadium oxides as V raw materials; various types of alumina such as α-alumina, β-alumina and γ-alumina as Al raw materials; various types of silica as Si raw materials; $P_2O_5$ as a P raw material; $Bi_2O_3$ as a Bi raw material; and CaO, $CaCO_3$, $Ca(OH)_2$ and $CaCl_2$ as Ca raw materials, provided that at least one of Li, Na, K, Sr, Y, La, Ti, Zr, V, Al, Si, P and Bi-containing compounds, at least one Mg-containing compound, and at least one Fe-containing compound are selected;
ii) sintering the mixed raw materials to grow particles, wherein a maximum temperature is in the range of 800-1500° C.; and
(iii) heating the sintered raw materials under an oxygen-containing atmosphere to condition properties of the particles, wherein a maximum temperature is in the range of 300-1000° C.; and
wherein the oxygen concentration in the atmosphere of step (iii) is higher than that of step (ii).

10. The process of claim 9, wherein the atmosphere of the step (iii) is an inert gas atmosphere having an oxygen concentration of 0.05 to 25.0 vol %.

11. The process of claim 9, wherein the atmosphere of the step (ii) is an inert gas atmosphere having an oxygen concentration of 0.001 to 10.0 vol %.

12. The process of claim 9, wherein the step (i) of mixing raw materials comprises steps of:
preparing a slurry containing an Mg-containing compound and an Fe-containing compound; and
drying the slurry for granulation.

13. The process of claim 12, wherein the slurry containing an Mg-containing compound and an Fe-containing compound further comprises a compound containing Li, Na, K, Rb, Cs, Sr, Ba, Y, La, Ti, Zr, Hf, V, Nb, Ta, Al, Ga, Si, Ge, P, Sb, Bi, Ca or a combination thereof.

14. The process of claim 12 or claim 13,
wherein the slurry containing an Mg-containing compound and an Fe-containing compound further comprises a binder, and
wherein the content of the binder is in the range of 0.1-5 wt %, based on the total amount of the raw materials in the slurry.

15. A Mg-based ferrite material as claimed in claim 1, wherein "a" is from 0.003 to 0.19, "b" is from 0.10 to 0.20, "c" is from 1.6 to 1.8, "d" is from 0.025 to 0.43, and "e" is from 2.5 to 3.0.

16. An Mg-based ferrite material obtained by a process comprising steps of:
i) mixing raw materials appropriately selected from MgO, $MgCO_3$, $Mg(OH)_2$ and $MgCl_2$ as Mg raw materials; FeO, $Fe_2O_3$, $Fe_3O_4$ and $Fe(OH)_x$ (wherein x is a number of 2 to 3) as Fe raw materials; $Li_2O$, $Li_2CO_3$ and LiOH as Li raw materials; $Na_2O$, $Na_2CO_3$ and NaOH as Na raw materials; $K_2O$, $K_2CO_3$ and KOH as K raw materials; SrO and $SrCO_3$ as Sr raw materials; $Y_2O_3$ as a Y raw material; $La_2O_3$ as a La raw material; $TiO_2$ including anatase and rutile as a Ti raw material; $Zr(OH)_4$ and $ZrO_2$ as Zr raw materials; various types of vanadium oxides as V raw materials; various types of alumina such as α-alumina, β-alumina and γ-alumina as Al raw materials; various types of silica as Si raw materials; $P_2O_5$ as a P raw material; $Bi_2O_3$ as a Bi raw material; and CaO, $CaCO_3$, $Ca(OH)_2$ and $CaCl_2$ as Ca raw materials, provided that at least one of Li, Na, K, Sr, Y, La, Ti, Zr, V, Al, Si, P and Bi-containing compounds, at least one Mg-containing compound, and at least one Fe-containing compound are selected;
(ii) sintering the mixed raw materials to grow particles, wherein a maximum temperature is in the range of 800-1500° C.; and
(iii) heating the sintered raw materials under an oxygen-containing atmosphere to condition properties of the particles, wherein a maximum temperature is in the range of 300-1000° C.;
wherein the oxygen concentration in the atmosphere of step (iii) is higher than that of step (ii).

* * * * *